US008827345B2

(12) United States Patent
VanMiddendorp et al.

(10) Patent No.: US 8,827,345 B2
(45) Date of Patent: Sep. 9, 2014

(54) ELECTRO-MECHANICAL SEAT SWIVEL SYSTEM

(71) Applicant: Caterpillar Inc., Peoria, IL (US)

(72) Inventors: Brian VanMiddendorp, Houston, TX (US); Matt Gielda, Peoria, IL (US); Jonathan C. Catton, Brimfield, IL (US); Jason Dare, Peoria, IL (US); Lalit S. Deshpande, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/756,265

(22) Filed: Jan. 31, 2013

(65) Prior Publication Data
US 2013/0193729 A1  Aug. 1, 2013

Related U.S. Application Data

(60) Provisional application No. 61/592,862, filed on Jan. 31, 2012.

(51) Int. Cl.
*B60N 2/38* (2006.01)
*B60N 2/14* (2006.01)

(52) U.S. Cl.
USPC .................................. 296/65.06; 297/344.22

(58) Field of Classification Search
CPC ..... B60N 2/146; B60N 2/38; B60N 2002/022
USPC ........... 296/65.06, 65.07; 297/344.22, 344.23
See application file for complete search history.

(56) References Cited

U.S. PATENT DOCUMENTS

| | | | | |
|---|---|---|---|---|
| 4,518,139 | A | * | 5/1985 | Barfell ........................ 248/418 |
| 5,941,498 | A | * | 8/1999 | Hoshihara et al. ............. 248/550 |
| 7,648,186 | B2 | * | 1/2010 | Ukai et al. .................. 296/65.06 |
| 8,078,364 | B2 | | 12/2011 | Mabuchi et al. |
| 2001/0013717 | A1 | * | 8/2001 | Bowers et al. ........... 297/344.22 |
| 2003/0062753 | A1 | * | 4/2003 | Chao ........................ 297/344.22 |
| 2004/0211616 | A1 | * | 10/2004 | Ueda et al. .................... 180/326 |
| 2005/0248302 | A1 | * | 11/2005 | Garland ........................ 318/280 |
| 2007/0074923 | A1 | * | 4/2007 | Billger et al. ................. 180/330 |
| 2011/0018324 | A1 | | 1/2011 | Horiguchi et al. |
| 2011/0193390 | A1 | * | 8/2011 | Hsiao ....................... 297/344.22 |

FOREIGN PATENT DOCUMENTS

| | | |
|---|---|---|
| EP | 1264940 | 12/2002 |
| EP | 2127938 | 12/2009 |

* cited by examiner

*Primary Examiner* — Jason S Morrow
(74) *Attorney, Agent, or Firm* — Miller, Matthias & Hull

(57) ABSTRACT

An electro-mechanical seat swivel system may include a bottom plate mounted on a frame of a machine or vehicle, and top plate pivotally mounted on the bottom plate, and an operator seat mounted on the top plate. A pawl may be movably mounted on the bottom plate and engage latch catch brackets mounted to the top plate to lock the seat in predetermined operator seat positions. An electro-mechanical actuator may be mounted to the seat and operatively coupled to the pawl. Latch control switches disposed at operator controls may be operated to cause the electro-mechanical actuator to disengage from one of the latch catch bracket to allow the seat to be rotated to another of the predetermined operator seat positions where the pawl will engage the corresponding latch catch bracket to again lock the operator seat in place.

20 Claims, 16 Drawing Sheets

ELECTRO-MECHANICAL SEAT SWIVEL SYSTEM

CROSS-REFERENCE TO RELATED APPLICATIONS

This application claims the benefit of U.S. Provisional Patent Appl. No. 61/592,862, filed Jan. 31, 2012, which is expressly incorporated by reference herein in its entirety.

TECHNICAL FIELD

The present disclosure relates generally to swivel seats for a machine or vehicle and, more particularly, to an electro-mechanical seat swivel system for releasing a swivel seat to allow repositioning of the seat to a desired position, and relocking the seat in the new position.

BACKGROUND

Machines, such as skid steer loaders, multi terrain loaders, backhoe loaders, agricultural tractors, track-type tractors, articulated trucks, wheel loaders, and other types of construction, mining, or agricultural machinery and vehicles are used for a variety of tasks requiring operator control. Typically, an operator controls these machines through an interface. For machines having a fixed operator orientation, only a single set of input devices in one location within the operator cab is needed for various machine controls, such as for throttle control, transmission control and control of an implement. However, in a machine or vehicle requiring multiple operator orientations for controlling different operations or implements, such as operating a front bucket and a rear backhoe of a backhoe loader, or driving a wheel skidder in both directions and operating a grapple at a logging site, an operator may require more input devices, such as devices operable in a forward direction, other devices operable in a reverse direction, and possibly additional devices operable in an intermediate position. Operation of the machine or vehicle requires robust swivel action to keep the machine or vehicle operating at full capacity.

In known swivel seats, a mechanical swivel linkage is installed with a release lever positioned below the level of the seating surface and at the front or on one side of the seat. To release the linkage, the operator or driver must take one hand off the controls and reach down to move the release lever to an unlocked position. Once the linkage is released, the operator pushes off with their legs to cause the seat to rotate to the desired position where the linkage can be relocked to hold the seat in place. Depending on the location and the operator's ability to find the release lever, the operator may need to temporarily take his eyes off the controls and the work area around the machine or vehicle and look down to locate and actuate the release lever. By reaching down to actuate the mechanical release lever, the machine operator loses productivity while executing the process step and temporarily relinquishes some control over the machine and awareness of the surroundings.

In view of this, a need exists for an improved swivel seat system that may be actuated by the operator without disengaging from the controls or diverting his attention from the controls and the area in and around the machine.

SUMMARY OF THE DISCLOSURE

In one aspect of the present disclosure, the invention is directed to a swivel seat assembly for a machine. The swivel seat assembly may include a bottom plate mounted to a frame of the machine to prevent rotation of the bottom plate relative to the machine about a rotational axis, a top plate pivotally mounted to the bottom plate for rotation of the top plate relative to the bottom plate about the rotational axis, an operator seat mounted to the top plate for rotation with the top plate about the rotational axis, an actuator mounted on the bottom plate, and a latching member moveably mounted on the bottom plate and operatively connected to the actuator. The swivel seat assembly may further include at least two locking slots associated with the top plate and each defining a locking position of the top plate, with a first locking slot defining a first locking position and a second locking slot defining a second locking position, where the latching member engages the first locking slot to lock the top plate in the first locking position and the latching member engages the second locking slot to lock the top plate in the second locking position, and wherein the top plate rotates relative to the bottom plate between the first locking position and the second locking position. Still further, the swivel seat assembly may include a remote switch operatively connected to the actuator, wherein actuation of the remote switch when the latching member engages one of the first locking slot and the second locking slot cause the actuator to operate to disengage the latching member from the one of the first locking slot and the second locking slot to allow the top plate to rotate the latching member away from the one of the first locking slot and the second locking slot and toward the other of the first locking slot and the second locking slot.

In another aspect of the present disclosure, the invention is directed to a method of swiveling a swivel seat assembly of a machine. The swivel seat assembly may include a bottom plate mounted to a frame of the machine to prevent rotation of the bottom plate relative to the machine about a rotational axis, a top plate pivotally mounted to the bottom plate for rotation of the top plate relative to the bottom plate about the rotational axis, an operator seat mounted to the top plate for rotation with the top plate about the rotational axis, an actuator mounted on the bottom plate, a latching member moveably mounted on the bottom plate and operatively connected to the actuator, at least two locking slots associated with the top plate and each defining a locking position of the top plate, with a first locking slot defining a first locking position and a second locking slot defining a second locking position, where the latching member engages the first locking slot to lock the top plate in the first locking position, and the latching member engages the second locking slot to lock the top plate in the second locking position, and wherein the top plate rotates relative to the bottom plate between the first locking position and the second locking position, and a remote switch operatively connected to the actuator. The method may include engaging the first locking slot with the latching member to lock the top plate in the first locking position, actuating the remote switch to cause the actuator to disengage the latching member from the first locking slot, rotating the top plate from the first locking position to the second locking position, and engaging the second locking slot with the latching member when the top plate rotates into the second locking position to lock the top plate in the second locking position.

In a still further aspect of the present disclosure, the invention is directed to an electro-mechanical latching mechanism for limiting relative rotational movement between a first component and a second component pivotally connected to the first component. The latching mechanism may include an actuator mounted on the first component, a latching member moveably mounted on the first component and operatively connected to the actuator, and at least two locking slots associated with the second component and each defining a locking position of the second component, with a first locking slot defining a first locking position and a second locking slot defining a second locking position. The latching member engages the first locking slot to lock the second component in the first locking position and the latching member engages the second locking slot to lock the second component in the second locking position, and wherein the second component rotates relative to the first component between the first locking position and the second locking position. The latching mechanism may further include a remote switch operatively connected to the actuator, wherein actuation of the remote switch when the latching member engages one of the first locking slot and the second locking slot cause the actuator to operate to disengage the latching member from the one of the first locking slot and the second locking slot to allow the second component to rotate the latching member away from the one of the first locking slot and the second locking slot and toward the other of the first locking slot and the second locking slot.

Additional aspects of the invention are defined by the claims of this patent.

DETAILED DESCRIPTION

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . ." or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
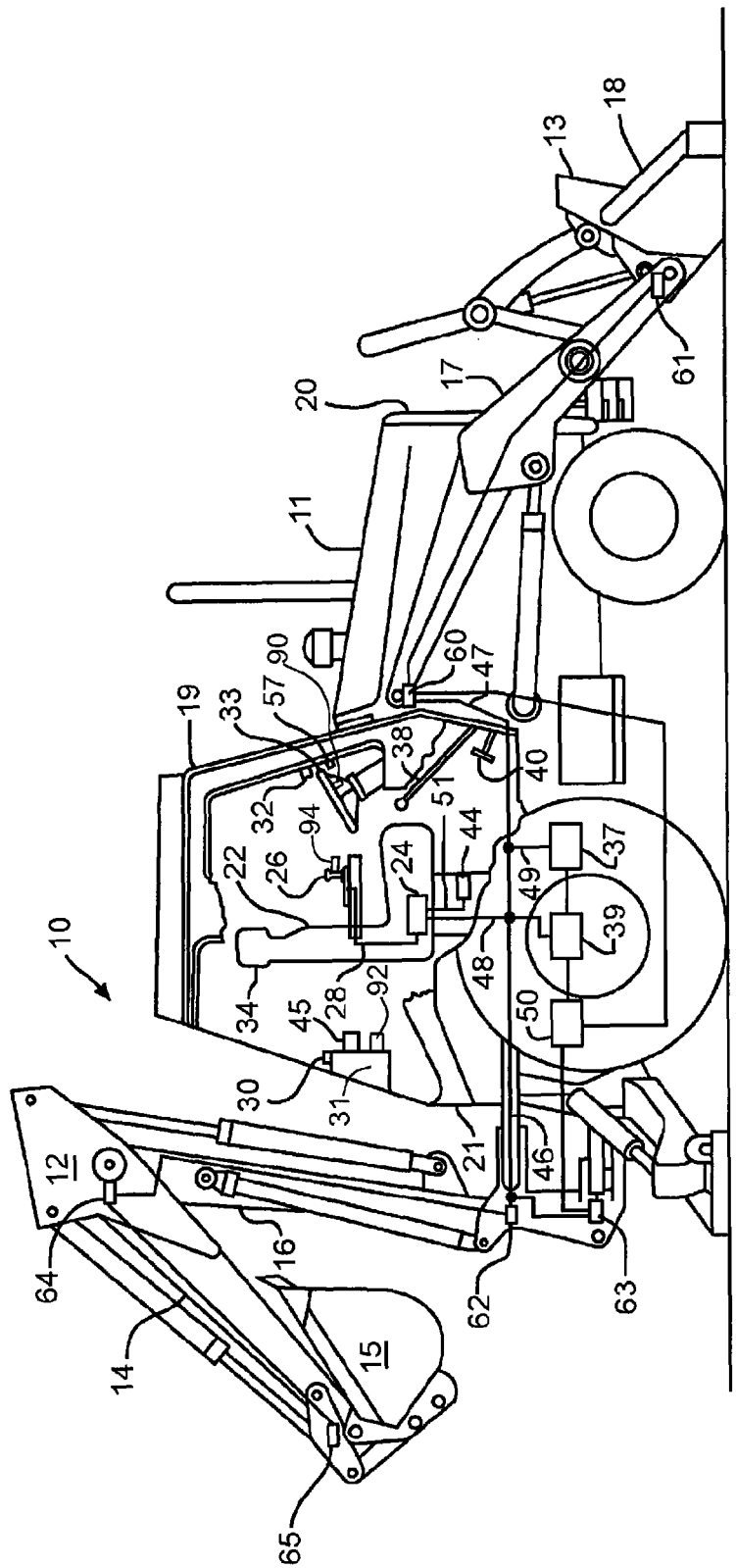
FIG. 1 is a side view of a backhoe loader including a swivel seat assembly in accordance with the present disclosure in a loader position.
Figure 2:
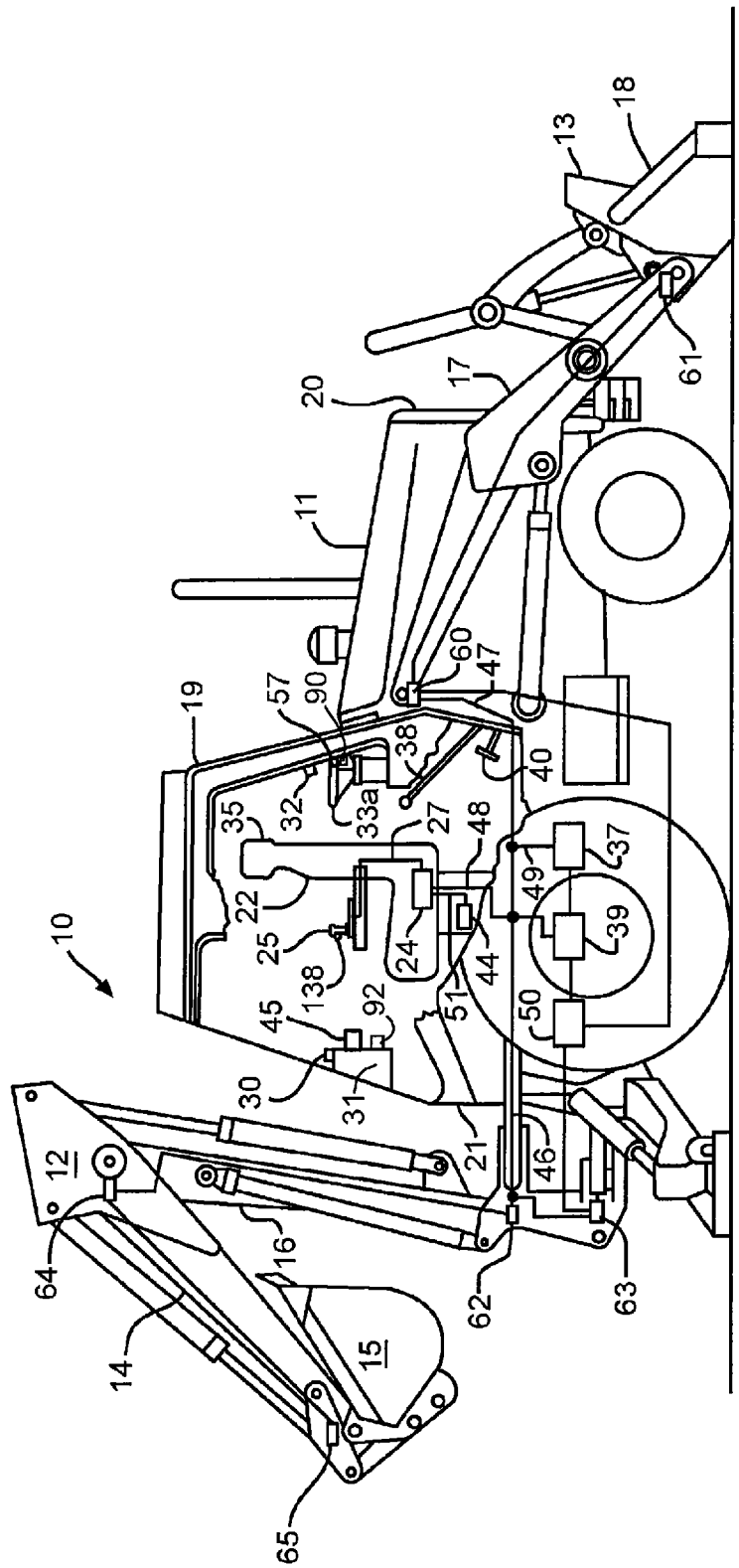
FIG. 2 is a side view of the backhoe loader of FIG. 1 including the swivel seat assembly in a backhoe position.
Figure 3:
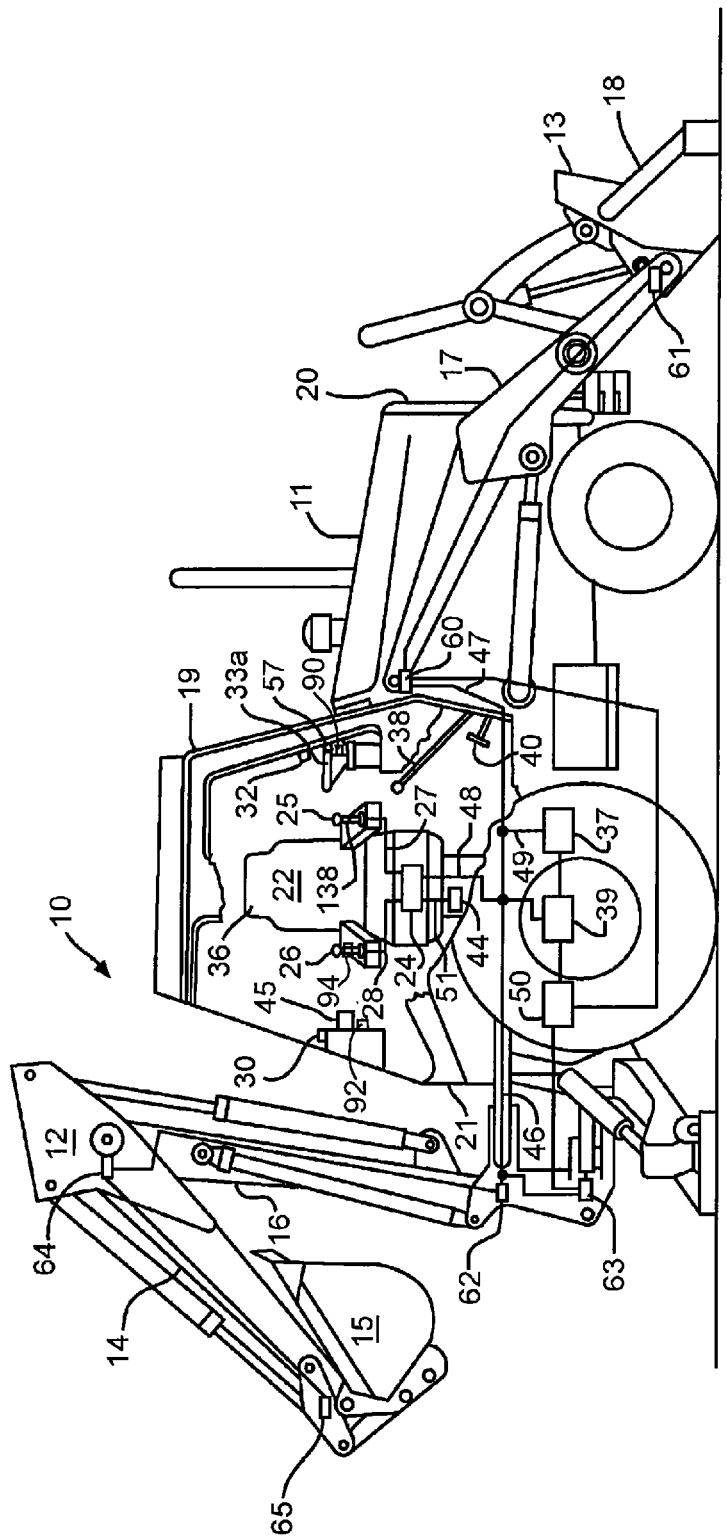
FIG. 3 is a side view of the backhoe loader of FIG. 1 including the swivel seat assembly in a middle position.

Referring to FIGS. 1-3, there are shown side views of a machine 10, which in the illustrated example is backhoe loader 10. Those skilled in the art will appreciate that the present disclosure contemplates other machines and vehicles, such as pavers and/or graders, wheel skidders, truck-type tractors and vibratory compactors, where different aspects of the machine and vehicles are operated from different positions of a swivel seat. Thus, although the machine 10 is illustrated as a backhoe loader 10, it should be appreciated that the present disclosure contemplates other types of machines. The term "machine" as used herein generically refers to any machine, vehicle or piece of equipment in which a swivel seat may be implemented. Discussions of "swivel seats" may refer to swivel seats installed in such machines or implemented in environments other than within machines. Those skilled in the art will appreciate that the term backhoe includes any machine with at least one implement used for stationary digging. For instance, the present disclosure could be applied to a backhoe dozer having a backhoe used for stationary digging attached to a rear side of the machine body and a dozer attached to a front side of the machine body. Further, the present disclosure may apply to a backhoe in which some other tool has been substituted in place of the backhoe bucket, such as a ram.

The backhoe loader 10 includes a machine body 11. Attached to a rear side 21 of the machine body 11 is a set of equipment, preferably a backhoe 12 generally used for stationary digging. Attached to a front side 20 of the machine body 11 is preferably a second set of equipment, shown as a loader 13 generally used for shoveling. The backhoe 12 includes a boom 16 that is moveably attached to the machine body 11, and can be moved upward and downward and swung left and right about a vertical axis. A stick 14 is moveably attached to the boom 16 and can be moved inward and outward. The backhoe 12 also includes a material engaging member, shown as a backhoe bucket 15 that is moveably attached to the stick 14. The backhoe bucket 15 can be curled in order to dig, and can be uncurled outward in order to dump material. The loader 13 includes a pair of arms 17 movably attached to the front side 20 of the machine body 11. The pair of arms 17 can be moved upward and downward in order to lift and lower a material engaging member, shown as a loader bucket 18. The loader bucket 18 is moveably attached to the pair of arms 17 and can be raised and lowered about a horizontal axis. There is at least one electronically controlled actuator attached to at least one hydraulic cylinder controlling the movement of each aspect of both the backhoe 12 and the loader 13, although mechanically or pressure controlled actuators may also be used. The illustrated backhoe loader 10 includes a loader arms actuator 60, a loader bucket actuator 61, a boom vertical movement actuator 62, a boom swing actuator 63, a stick actuator 64, and a backhoe bucket actuator 65.

An engine 39, which is attached to the machine body 11, is coupled to a transmission 37 in order to provide power for translational movement of the backhoe loader 10, and is coupled to at least one hydraulic pump 50 in order to provide power for operation of the backhoe 12 and the loader 13. The engine 39 may be any power source such as, for example, a diesel engine, a gasoline engine, a gaseous fuel driven engine, or any other engine known in the art. It is contemplated that the engine 39 may alternately include another source of power such as a fuel cell, a power storage device, an electric or hydraulic motor, and/or another source of power known in the art. It is also contemplated that the engine 39 may be operatively connected to the transmission 37 and the pump 50 by any suitable manner known in the art, such as, for example, gearing, a countershaft, and/or a belt. The engine 39 powers the hydraulic pump 50, which supplies pressurized hydraulic fluid to the hydraulic cylinders via the actuators 60, 61, 62, 63, 64, and 65. A throttle valve (not shown) controls the flow of fuel from the fuel pump to fuel injectors attached to the engine 39, and thereby controls the engine speed.

The backhoe loader 10 also includes a cab 19 in which a swivel seat assembly 22 is rotatably mounted to the machine body 11. Although the seat assembly 22 may include translational movement, the seat assembly 22 rotates about a vertical axis between one, two, three or more positions, such as, e.g., a forward facing position illustrated as a loader position 34 in FIG. 1, a rearward facing position illustrated as a backhoe position 35 in FIG. 2, and a middle facing position 36 in FIG. 3. The loader position 34 is preferably a latched position, and is separated by approximately 180 degrees from the backhoe position 35, also preferably a latched position. The middle facing position 36 may be a latched or unlatched position between the loader position 34 and the backhoe position 35. When the seat assembly 22 is in the loader position 34, the loader 13 may be enabled. When the seat assembly 22 is in at least one of the backhoe position 35 and the middle facing position 36, the backhoe 12 may be enabled.

A seat position sensor(s) 44 is positioned within the seat assembly 22. The seat assembly 22 is in communication with an electronic control module 24 through a seat communication line 51. The electronic control module or ECM 24 may include one or more microprocessors, a memory, a data storage device, a communications hub, and/or other components known in the art. It is contemplated that the ECM 24 may be further configured to receive additional inputs (not shown) indicative of various operating parameters of the machine 10 and or additional components, such as, for example, temperature sensors, positions sensors, and/or any other parameter known in the art. It is also contemplated that the ECM 24 may be preprogrammed with parameters and/or constants indicative of and/or relating to the machine 10. It is also contemplated that the ECM 24 may receive and deliver signals via one or more communication lines (not shown) as is conventional in the art. It is further contemplated that the received and delivered signals may be any known signal format, such as, for example, a current or a voltage level. The electronic control module 24 is illustrated as located within the seat assembly 22, but it should be appreciated that the electronic control module 24 could be installed at any appropriate location within the machine body 11.

In addition, while implement controllers could be attached to the machine body 11, a first joystick 25 and a second joystick 26 are preferably attached to a right and left side of the seat assembly 22. Although the joysticks 25, 26 could be mechanically operably coupled to the loader 13 and the backhoe 12, the first joystick 25 and the second joystick 26 are preferably in communication with the electronic control module 24 via a first communication line 27 and a second communication line 28, respectively. An engine speed reduction controller (not shown) may be mounted as a button attached to the second joystick 26, and is moveable between an on position and an off position, and is in communication with the ECM 24 via the second communication line 28. The ECM 24 is preferably in communication with the loader arms actuator 60 and the loader bucket actuator 61 via a loader communication line(s) 47, and is in communication with the boom vertical movement actuator 62, the boom swing actuator 63, the stick actuator 64, and the backhoe bucket actuator 65 via a backhoe communication line(s) 46. The ECM 24 is in communication with the engine 39 and the transmission 37 via an engine communication line 48 and a transmission communication line 49, respectively. Although the present disclosure is illustrated as including only one electronic control module 24, it should be appreciated that there could be any number of electronic control modules, including but not limited to, five additional electronic control modules, one to control each of the engine, the transmission 37, the backhoe 12, the loader 13, and a throttle valve (not shown), and each being in communication with the ECM 24.

A steering wheel 33 is preferably attached to the machine body 11 such that when the seat assembly 22 is in the loader position 34, the operator can use the steering wheel 33. The steering wheel 33 can be stowed for operation of the backhoe loader 10 when the seat assembly 22 is in the backhoe position 35 or the middle facing position 36.

Although it should be appreciated that a first transmission controller 38 could be attached to rotate with the seat assembly 22, the first transmission controller 38 is illustrated as attached to the machine body 11 such that when the seat assembly 22 is in the loader position 34, the operator can manipulate the first transmission controller 38. A second transmission controller 138 may also be provided. The second transmission controller 138 may include a column-mounted shifter, a joystick rocker switch, or a gear selector and used to control the transmission status. As shown in FIGS. 2-3, the second transmission controller 138 may be mounted to the left joystick 25 as a joystick rocker switch, selectable between forward, reverse, and neutral transmission states. The transmission 37 may be a mechanical or electrical variable-speed drive, a gear-type transmission, a hydrostatic transmission, or any other transmission known in the art. The first transmission controller 38 and the second transmission controller 138 operatively shift the transmission 37 between forward, neutral, and reverse gears.

An engine speed reduction-disabling switch 30 is preferably attached to a console 31 on the rear side 21 of the machine body 11, and is moveable between an activated position and a de-activated position.

Although it should be appreciated that there could be only one manual throttle controller, the present disclosure is illustrated as including two throttle controllers 40, 45. A first throttle controller, preferably a hand operated throttle controller 45, is preferably moveably attached to the console 31 on the rear side 21 of the machine body 11. The operator can control the engine speed when the transmission 37 is not engaged by manipulating the hand-operated throttle controller 45. A second throttle controller, preferably a foot pedal 40, is also attached to the machine body 11, although it should be appreciated that the foot pedal 40 could be attached to the seat assembly 22 at a point that the operator can reach when operating the loader 13. The foot pedal 40 allows the operator to control the machine speed when driving the backhoe loader 10 and, at least in part, when operating the loader 13. The throttle controllers 40, 45 and the transmission controller 38 are coupled to ECM 24 and the transmission 37, respectively. It should be appreciated that the throttle controllers 40, 45 and the transmission controller 38 could be mechanically operably coupled or electronically operably coupled via the electronic control module 24 to the fuel system and the transmission 37, respectively.

Figure 4:
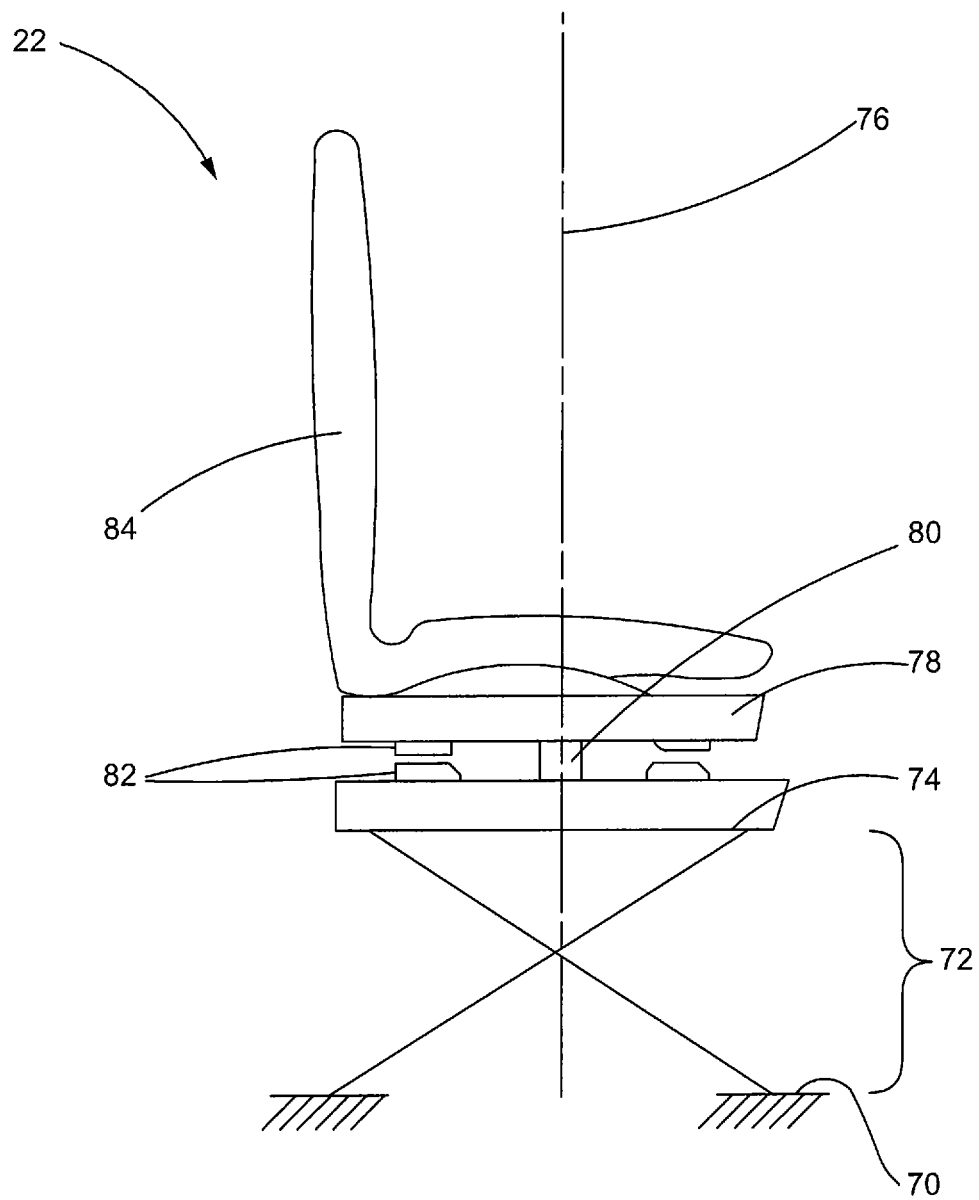
FIG. 4 is a schematic side view of the swivel seat assembly of FIG. 1.

As discussed, the swivel seat assembly 22 mounted within the operator cab 19 to allow the operator to be positioned facing the loader position 34, the backhoe position 35 or the middle facing 36. FIG. 4 is a schematic illustration of the swivel seat assembly 22 mounted to a frame 70 of the machine 10 within the operator cab 19. The swivel seat assembly 22 may include a suspension 72 secured to the frame 70 to provide cushioning for the operator as the machine 10 is driven and performs other work functions. A bottom plate 74 may be attached at the upper end of the suspension 72 to remain relatively stationary with respect to the frame 70 with the exception of up and down motion with the suspension 72 and linear movement forward and rearward to adjust the position of the operator relative to the instruments of the machine 10. The bottom plate 74 may be substantially free of rotation about a vertical rotational axis 76. A top plate 78 may be rotatably mounted on the bottom plate 74 by a shaft 80 allowing the top plate 78 to rotate about the rotational axis 76 relative to the bottom plate 74. The top plate 78 may be further supported in a manner facilitating rotation by a thrust bearing 82 disposed between the plates 74, 78. An operator seat 84 may be mounted on the top surface of the top plate 78 for rotation with the top plate 78 about the rotational axis 76.

As discussed above, previously known swivel seats incorporated mechanical latching mechanisms having lever arms mounted at the lower front or sides of the seat. Swivel seats assemblies 22 in accordance with the present disclosure provide electro-mechanical latching mechanisms having a control switch or switches positioned with other operator controls so the operator can actuate the switches without diverting attention and vision from the controls and the work area. Returning to FIGS. 1-3, the machine 10 may include one or more of a steering wheel latch control switch 90 mounted on the steering wheel 33, a rear console latch control switch 92 mounted on the console 31, and a joystick latch control switch 94 mounted on one of the joysticks 25, 26. The requirements of a particular machine 10 will dictate the number and positioning of the latch control switches 90, 92, 94. For example, where joysticks 25, 26 are not provided on the operator seat 84 and the middle seat facing position 36 is not used, the latch control switches 90, 92 may be provided so the operator can use the latch control switch 90 to release the latching mechanism after driving the machine 10 or operating the loader 13, and use the latch control switch 92 to release the latching mechanism after operating the backhoe 12. Where joysticks 25, 26 are provided, the latch control switches 90, 92 may be omitted and the latch control switch 94 used to release the latching mechanism from any position of the operator seat 84. Other combinations of the latch control switches 90, 92 94 as well as other switches are possible and are contemplated by the inventors as having use in swivel seat assemblies in accordance with the present disclosure.

Figure 5:
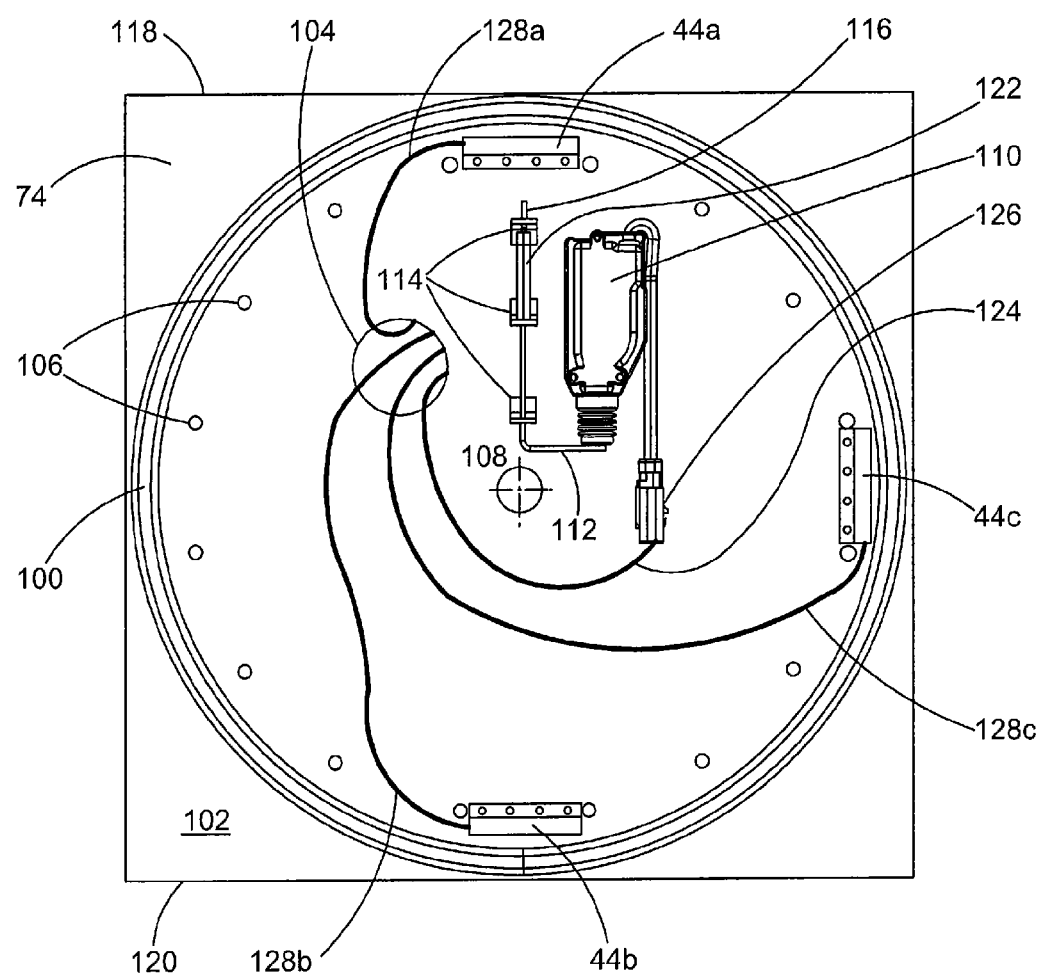
FIG. 5 is a top view of a bottom plate of the swivel seat assembly of FIG. 1.
Figure 6:
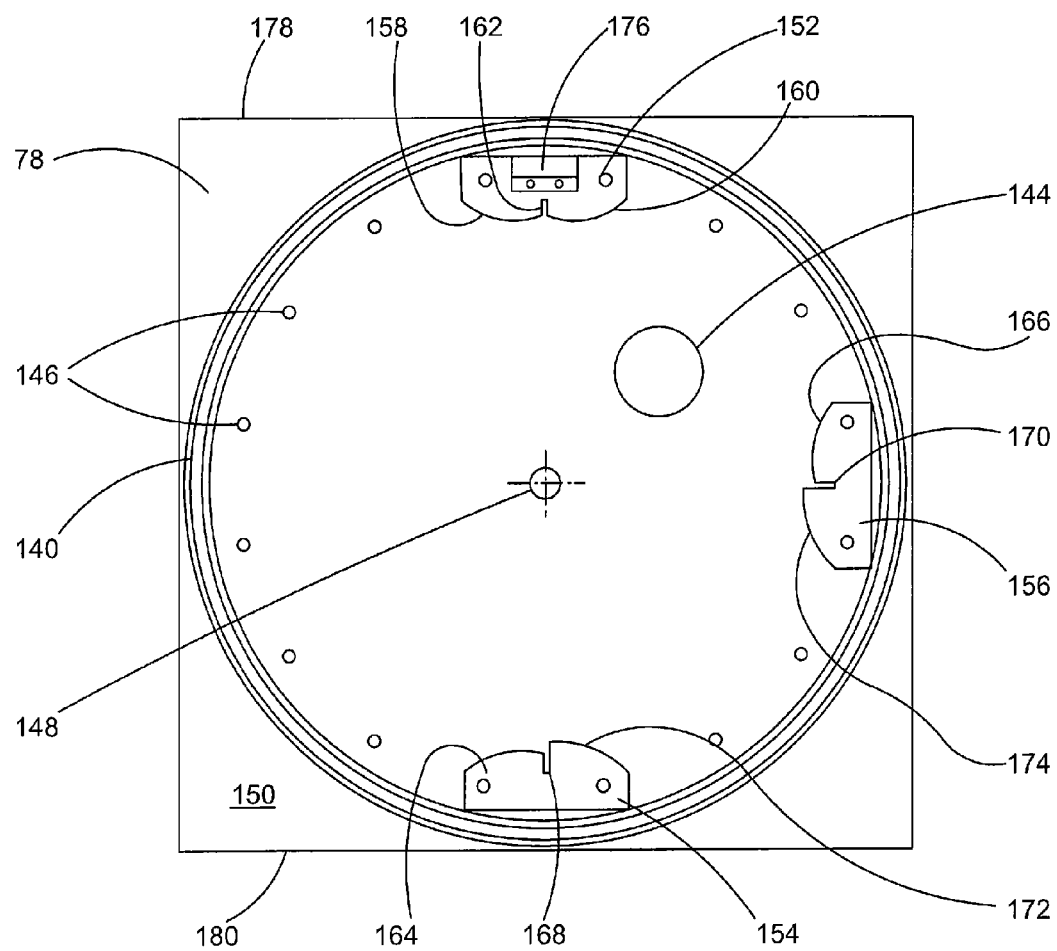
FIG. 6 is a bottom view of a top plate of the swivel seat assembly of FIG. 1.

FIGS. 5 and 6 illustrate embodiments of the bottom plate 74 and the top plate 78, respectively, and showing the electro-mechanical latching mechanism of the swivel seat assembly 22. In the illustrated embodiment, a single plate design may be universally used for both plates 74, 78 to minimize the number of molds or stamps used in producing the plates 74, 78 and reduce the required inventory of plates. Turning to FIG. 5, the bottom plate 74 may be generally square or rectangular, or otherwise shaped to conform to the operator seat 84 as necessary, and may have a thrust bearing roller race 100 stamped into or mounted on a top surface 102 of the bottom plate 74. The roller race 100 may be configured to receive a plurality of ball bearings or roller bears allowing the top plate 78 to rotate about the shaft 80 and to bear the axial loads applied by the weight of the operator seat 84 and the operator. The roller race 100 may encircle and the thrust bearing 82 may enclose the components of the latching mechanism. Access to the space within the thrust bearing 82 may be provide by an access hole 104 through the bottom plate 74 through with electrical wiring and other necessary lines may be fed as will be discussed further below. The universal plate may also include an array of mounting holes 106 circumferentially spaced about a shaft hole 108 for the shaft 80 and disposed at a radial distance from the shaft hole 108 to allow the elements of the latching mechanism to be mounted within the boundaries of the array 106.

The electro-mechanical latching mechanism may include an actuator 110 mounted to the top surface 102 of the bottom plate 74 within the array of holes 106. An end of the actuator 110 may be in operative contact with an end of a pawl 112 slidably mounted to the top surface 102 of the bottom plate 74 by support brackets 114. The actuator 110 and pawl 112 may be positioned on the bottom plate 74 so that a pawl tip 116 is disposed proximate a front edge 118 and opposite a rear edge 120 of the bottom plate 74 that may be defined based on the orientation of the bottom plate 74 with respect to the front and rear ends of the machine 10 when the swivel seat assembly 22 is installed. The positioning of the actuator 110 and pawl 112 with respect to the front edge 118 and rear edge 120 is exemplary only, and those skilled in the art will understand that the components may be positioned at other locations around the shaft hole 108 as necessary to control the rotation of the operator seat 84, with the other components of the latching mechanism being positioned accordingly.

A resilient member, such as a spring 122 may be provided to bias the pawl 112 with the pawl tip 116 in the extended position as shown in FIG. 5. The spring 122 as illustrated has one end abutting one of the support brackets 114 and the opposite end connected to the pawl 112. The spring 122 may compress when a force is applied to move the pawl 112 toward the shaft hole 108, and force the pawl 112 to return to the extended position when the force is removed. The spring 122 is exemplary only, and other resilient or biasing members causing the pawl 112 to move toward the extended position will be apparent to those skilled in the art and are contemplated by the inventors.

Those skilled in the art will appreciate that the combination of the actuator 110, pawl 112 and spring 122 is exemplary, and alternative electro-mechanical latching mechanisms are possible and are contemplated by the inventors as having use in swivel seat assemblies 22 in accordance with the present disclosure. For example, the pawl 112 as illustrated herein moves linearly to lock and unlock the operator seat 84, but the latching member could have any path of motion to move the latching member into and out of the latching position, such as curved motion or a more complex motion. The actuator 110 could be any kind of work cylinder capable of engaging and moving the latching member, or may be any other type of device that may be actuated by a signal from the operator and move the pawl 112 or other latching member out of engagement to unlock the operator seat 84.

As discussed above, seat position sensors 44 may be provided to transmit feedback to the ECM 24 regarding the position of the swivel seat assembly 22. In some implementations, it may be desirable to limit the operator's ability to release the seat 84 when certain operations are being performed. For example, it may be undesirable for safety reasons to allow the operator to release the seat 84 when the transmission 37 is engaged and the backhoe loader 10 is being driven forward. In the illustrated embodiment, and plurality of sensors 44 may be provided for detection of each of the seat positions 34, 35, 36. Consequently, a front seat position sensor 44a, a rear seat position sensor 44b and a middle seat position sensor 44c may be provided for the seat positions illustrated in FIGS. 1-3. The seat position sensors 44a, 44b, 44c may be attached to the top surface 102 as shown, or may have fastening mechanisms allowing the sensors 44a, 44b, 44c to be secured in place with holes of the hole array 106. As a further alternative, a separate array of holes may be provided for attachment of the sensors 44a, 44b, 44c to the bottom plate 74. As with the actuator 110 and pawl 112, the sensors 44a, 44b, 44c may be attached to the bottom plate 74 at any appropriate location to operation in conjunction with a corresponding indicator(s) on the top plate 78.

Power and the capability to communicate with other components of the machine 10 may be provided through the access hole 104 through the bottom plate 74. The actuator 110 may have an actuator signal line 124 extending from a wiring harness 126 through the access hole 104. The opposite termination of the actuator signal line 124 may depend on the simplicity or complexity of the control of the actuator 110. In a simple implementation, the actuator 110 may be operatively connected to the latch control switches 90, 92, 94 that may be present in the operator cab 19, and an electrical power supply of the machine 10, such as a battery, alternator or generator. When one of the latch control switches 90, 92, 94 is actuated, the actuator 110 moves the pawl 112 from the extended position, such as in the manner discussed further below. In more complex implementations, the actuator signal line 124 as well as the latch control switches 90, 92, 94 may be operatively connected to the ECM 24, and the ECM 24 may be programmed to operate the actuator 110 only when certain operating conditions are met. In the example above where the operator may be prohibited from swiveling the operator seat 84 when the transmission 37 is engaged and the machine 10 is being driven forward, actuating one of the latch control switches 90, 92, 94 may cause the ECM 24 to evaluate sensors for the transmission 37, transmission controllers 38, 138, engine 39, wheels or other components to determine whether the machine 10 is moving or being driven by the engine 39. The ECM 24 may suppress operation of the actuator 110 if the machine 10 is moving, and may transmit a signal to operate the actuator 110 if the machine 10 is stopped.

The seat position sensors 44a, 44b, 44c may have corresponding sensor signal lines 128a, 128b, 128c extending and threaded through the access hole 104 and operatively connected to the ECM 24. Signals may be transmitted over the lines 128a, 128b, 128c to the ECM 24 when the corresponding sensors 44a, 44b, 44c are disposed proximate a triggering component of the top plate 78 such as that discussed further below. In the illustrated embodiment, the seat position sensors 44a, 44b, 44c may be magnetic response switches, such as Reed switches, that respond to the presence of a magnetic field, the triggering component may be a magnet and the ECM 24 may be programmed to determine the position of the seat 84 based on which of the seat position sensors 44a, 44b, 44c is closed. Of course, other types of sensors and switches may be implemented to provide signals indicative of the position of the seat 84, such as mechanical or pressure sensitive switches engaged by a corresponding triggering component of the top plate 78, optical switches and the like.

An embodiment of the top plate 78 is illustrated in FIG. 6, and may be formed by the same stamp or die as the bottom plate 74 and include a thrust bearing roller race 140, an access hole 144, a hole array 146 and shaft hole 148 positioned on the top plate 78 in a similar manner as the corresponding elements of the bottom plate 74. A bottom surface 150 of the top plate 78 may have components attached thereto for engagement by the pawl tip 116 to lock the top plate 78 in a given position. In the illustrated embodiment, the top plate 78 may include a two-way latch catch bracket 152 and a pair of one-way latch catch brackets 154, 156 attached to the bottom surface 150 via the array of holes 146. As will be explained more thoroughly below, the latch catch brackets 152, 154, 156 are arranged to permit 270° of rotation of the operator seat 84 between the latch catch brackets 154, 156, with 90° of rotation between the end bracket 156 and the intermediate 152, and 180° of rotation between the opposite end bracket 154 and the intermediate bracket 152. The latch catch brackets 152, 154, 156 may be moved to other discrete positions defined by the hole array 146 to increase or decrease the amount of rotation of the seat 84 and the positions at which the seat 84 will stop, and intermediate brackets 152 may be added or removed at locations about the array of holes 146 to add or omit intermediate locking positions of the seat 84.

The intermediate two-way latch catch bracket 152 may be positioned at an intermediate location of the arc through which the operator seat 84 may swivel, and may allow the pawl 112 to rotate into engagement and past the latch catch bracket 152 from either direction. The latch catch bracket 152 may include a pair of camming surfaces 158, 160 that may engage the pawl tip 116 push the pawl 112 toward a retracted position so the top plate 78 may continue to rotate until the pawl tip 116 may enter a locking slot 162. The camming surfaces 158, 160 may be rounded or arc-shaped as shown, or may have a ramp or wedge shape, or any other appropriate shape that may engage the pawl tip 116 and cause the pawl 112 to retract against the biasing force of the resilient member 122. The locking slot 162 may be dimensioned to receive the pawl tip 116 therein and engage the pawl tip 116 to prevent rotation of the top plate 78.

The one-way latch catch brackets 154, 156 may be configured to allow the top plate 78 to rotate into engagement from one direction and lock the seat 84 in place, but prevent further rotation past the latch catch brackets 154, 156. When the top plate 78 is inverted and installed above the bottom plate 74 as discussed hereinafter, the latch catch bracket 154 may limit counterclockwise rotation, and the latch catch bracket 156 may limit clockwise rotation of the top plate 78 and the operator seat 84. Each of the latch catch brackets 154, 156 may have a camming surface 164, 166, respectively, that may be similar to the camming surfaces 158, 160 of the intermediate bracket 152 and guide the pawl tip 116 into locking slots 168, 170. The sides of the latch catch brackets 154, 156 opposite the locking slots 168, 170 may have stop surfaces 172, 174, respectively, extending inwardly toward the shaft hole 148 and configured to engage pawl tip 116, a support bracket 114 of the pawl 112 and/or other engagement member of the bottom plate 74 to prevent further rotation allowing the pawl tip 116 to pass the latch catch brackets 154, 156.

In the illustrated embodiment where the seat position sensors 44a, 44b, 44c may be magnetic responsive switches, the top plate 78 may include a magnet 176 attached thereto for movement with the top plate 78 and alignment with the seat position sensors 44a, 44b, 44c when the operator seat 84 is oriented in the various locking positions. The magnet 176 as illustrated is mounted at the intermediate bracket 152 on the top plate 78 so that a magnet 176 is disposed proximate a front edge 178 and opposite a rear edge 180 of the top plate 78 that may correspond to and align with the front edge 118 and rear edge 120 when the operator seat 84 faces the front of the machine 10. The positioning of the magnet 176 with respect to the front edge 178 and rear edge 180 is exemplary only, and those skilled in the art will understand that the magnet 176 may be positioned at other locations around the shaft hole 148 as necessary to align with the seat position sensors 44a, 44b, 44c when the seat 84 is in the locked positions. Moreover, where seat position sensors 44a, 44b, 44c other than magnetic responsive switches are implemented, the magnet 176 may be replaced with an appropriate triggering component that may actuate the seat position sensors 44a, 44b, 44c when rotated into alignment.

INDUSTRIAL APPLICABILITY

Figure 7:
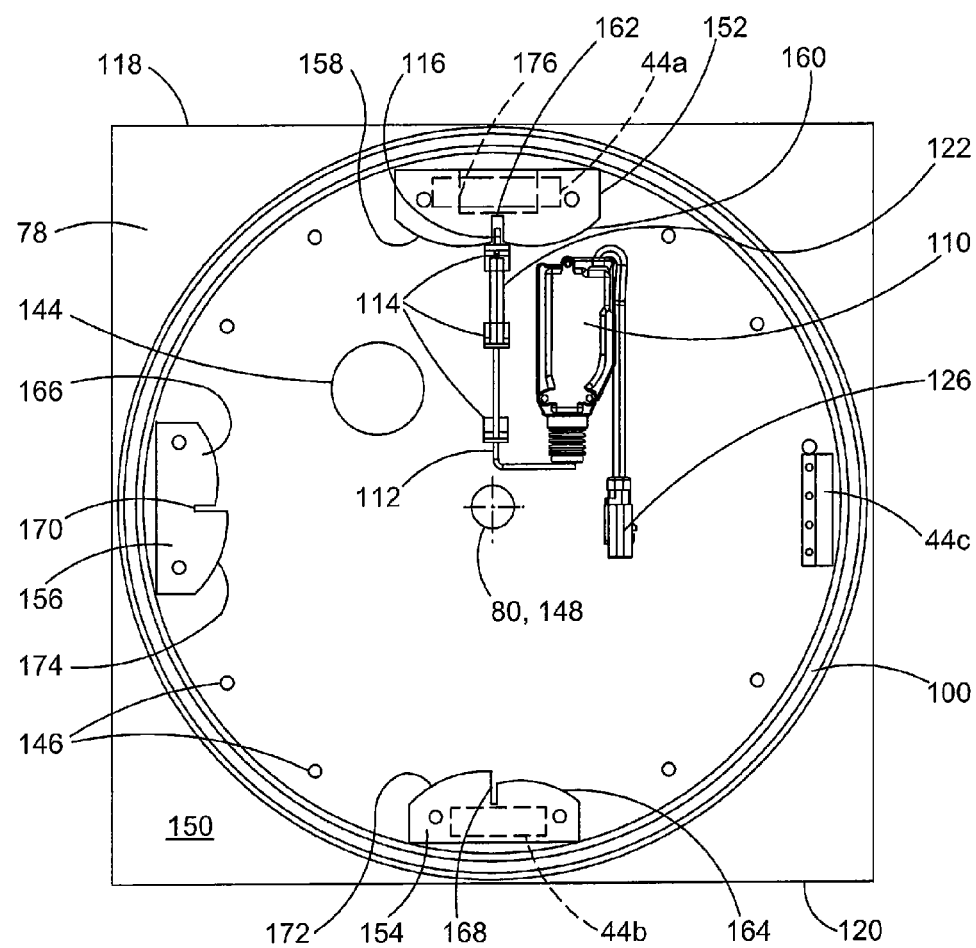
FIG. 7 is a top view of the swivel seat assembly of FIG. 1 in the loader position of FIG. 1 with the operator seat and top plate removed for clarity.

In operation, the top plate 78 is mounted on the bottom plate 74 by the shaft 80, and the top plate 78 and the operator seat 84 are further supported for rotation by the thrust bearing 82. The operation of the swivel seat assembly 22 after the top plate 78 and seat 84 are in place will be discussed with reference to the top views of FIGS. 7-12 in which the top plate 78 and seat 84 are remove for clarity, but the latch catch brackets 152, 154, 156 and the magnet 176 (shown in hidden lines) are shown in position. The signal lines 124, 128a, 128b, 128c are also removed for clarity. Referring to FIG. 7, the components are shown in their relevant orientations when the swivel seat assembly 22 is in the loader position 34 of FIG. 1. The top plate 78 is rotated with the intermediate bracket 152 disposed proximate the front edge 118 of the bottom plate 74 with the pawl tip 116 extended and inserted into the locking slot 162 to lock the seat 84 in position. The magnet 176 may also be disposed proximate the front edge 118 of the bottom plate 74 and overlying the front seat position sensor 44a. In this position, the magnet 176 may cause the sensor 44a to close and transmit a signal to the ECM 24 for determination that the operator seat 84 is in the loader position 34.

Figure 8:
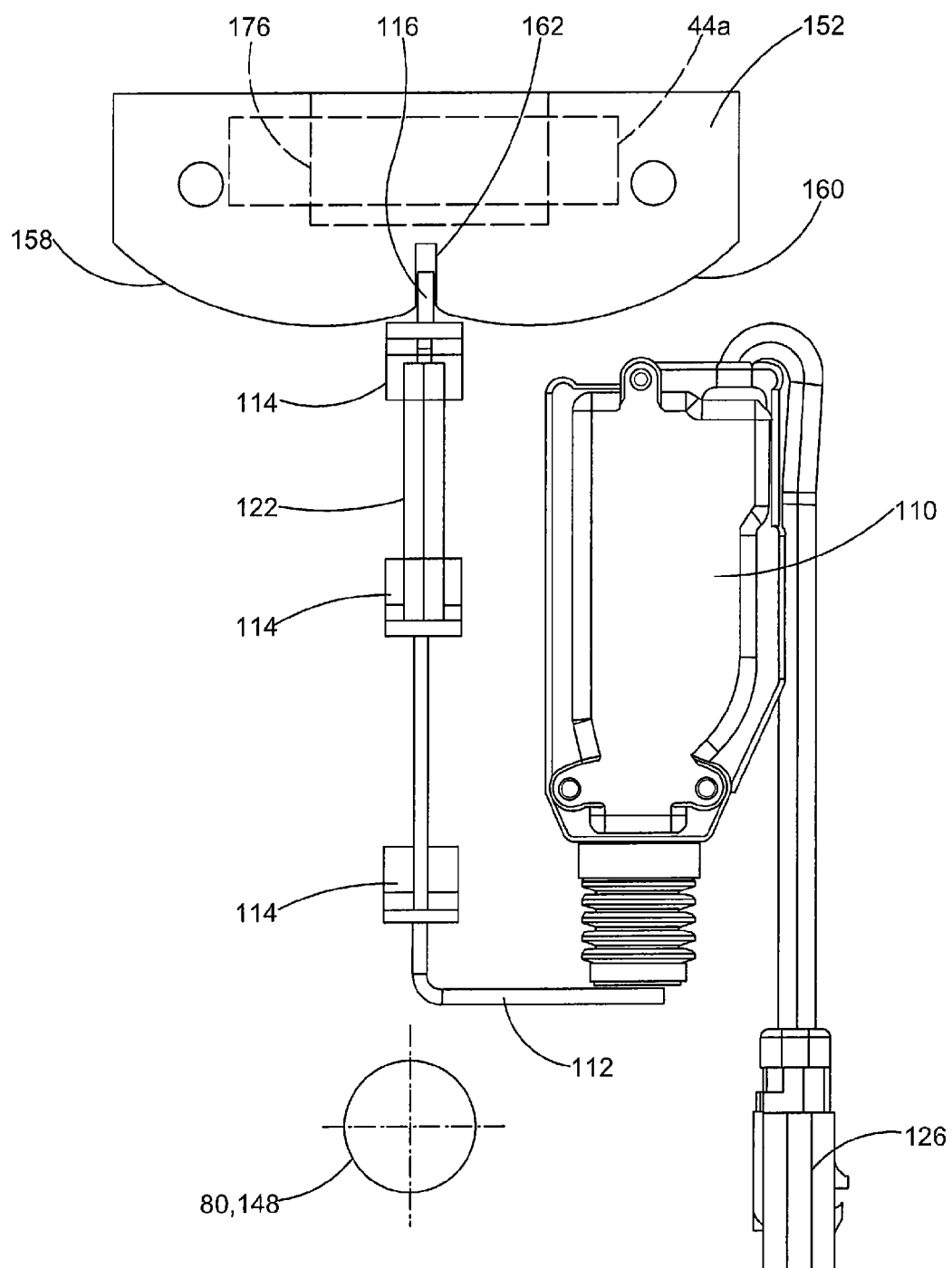
FIG. 8 is an enlarged top view of the actuator, pawl and two-way latch catch bracket of FIG. 7 with the pawl tip extended and received in the locking slot.
Figure 9:
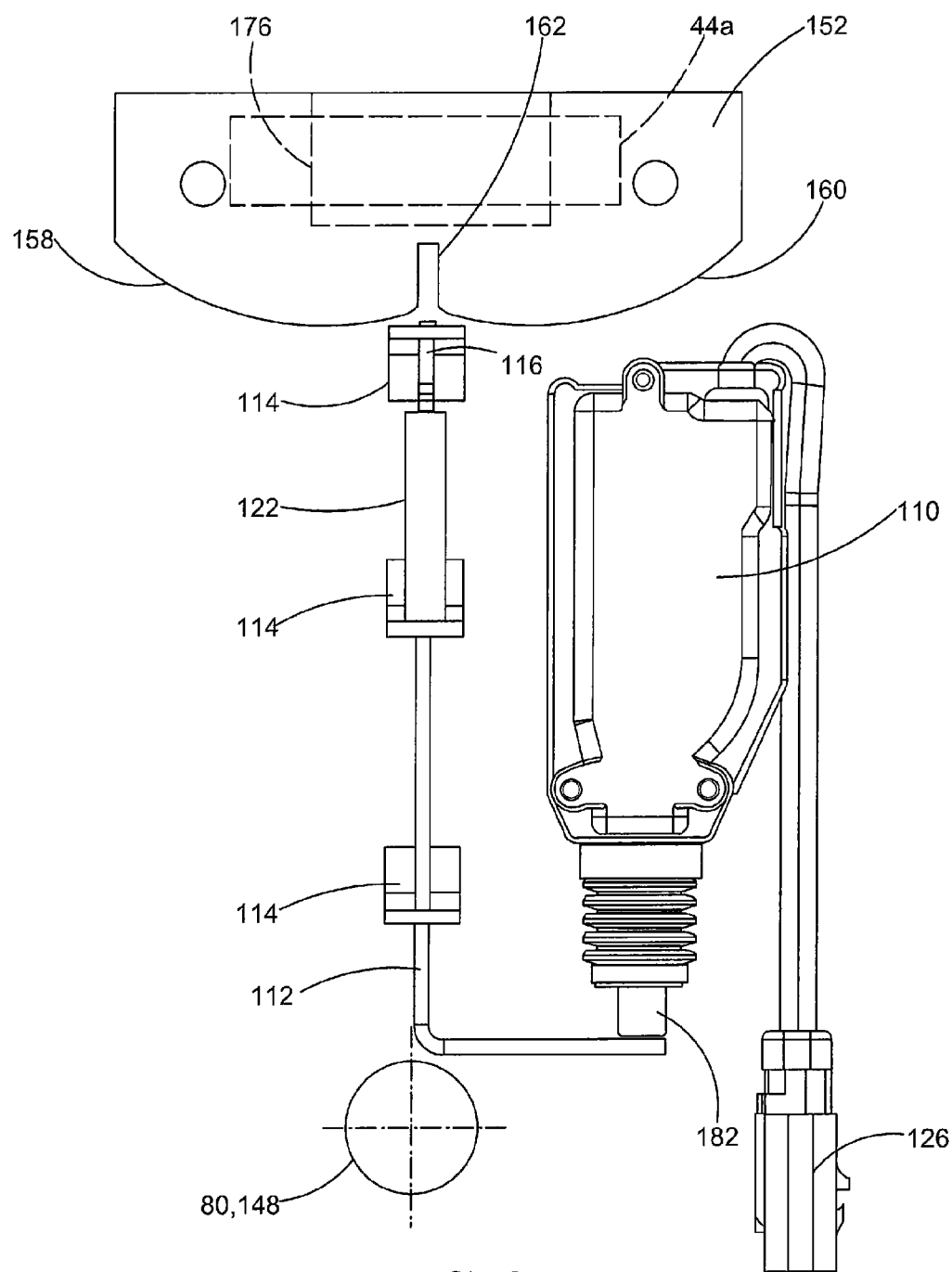
FIG. 9 is an enlarged top view of the actuator, pawl and two-way latch catch bracket of FIG. 7 with the pawl tip retracted from the locking slot.

FIG. 8 provides an enlarged view of the actuator 110, pawl 112 and intermediate latch catch bracket 152. The pawl tip 116 extends into the locking slot 162 and is engaged by the sides of the locking slot 162 to prevent rotation of the top plate 78 and seat 84. The spring 122 biases the pawl 112 toward the extended position to retain the pawl tip 116 in the locking slot 162. To unlock the operator seat 84 and swivel to another position, the operator may actuate the steering wheel latch control switch 90 or joystick latch control switch 94. Actuating one of the switches 90, 94 may cause a signal to be transmitted to the actuator 110, either directly or from the ECM 24, causing the actuator 110 to operate to drive the pawl 112 to a retracted position. Referring to FIG. 9, the actuator 110 in the illustrated embodiment may have a cylinder 182 that extends from the actuator when the signal is received to drive the pawl 112 to a retracted position. The pawl 112 may slide through the support brackets 114 to retract the pawl tip 116 from the locking slot 162. After the pawl tip 116 is retracted, the top plate 78 and seat 84 may be free to rotate in either direction to the desired position. The intermediate bracket 152 is positioned and the camming surfaces 158, 160 are dimensioned to provide clearance from the outward-most pawl support bracket 114 so that the intermediate bracket 152 may rotate out of position in either direction without engaging the retracted pawl tip 116 or pawl support bracket 114.

Figure 10:
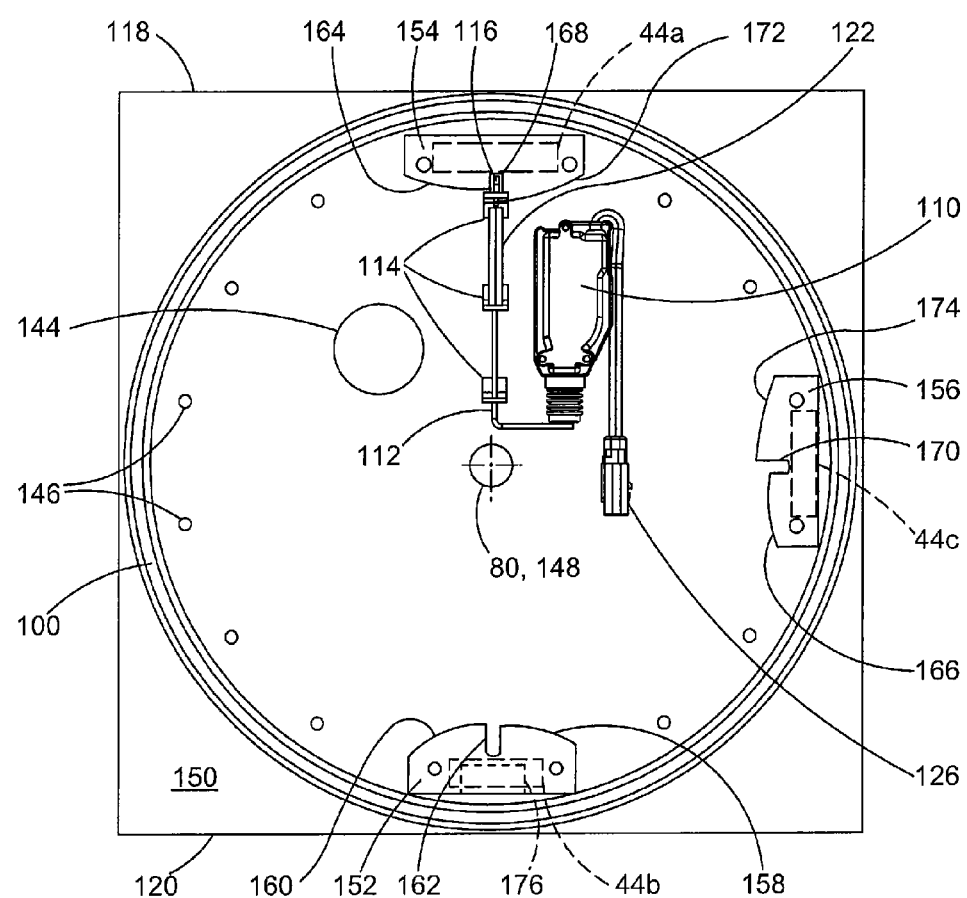
FIG. 10 is the top view of FIG. 7 with the swivel seat assembly in the backhoe position of FIG. 2.

FIG. 10 shows the orientation of the components after the top plate 78 and operator seat 84 are rotated 180° counter-clockwise from the loader position 34 of FIG. 1 to the backhoe position 35 of FIG. 2. Retracting the pawl tip 116 from the locking slot 162 of the intermediate bracket 152 allowed counterclockwise rotation of the top plate 78 to move the end latch catching bracket 154 toward the pawl 112. The actuator 110 may be deactivated when the switch 90 or 94 is released, or after a predetermined period of time to cease the force of the cylinder 182 and allow the pawl 112 to return to the extended position under the biasing force of the resilient member 122. As the end bracket 154 rotates toward and approaches the pawl 112, the camming surface 164 engages the pawl tip 116 and pushes the pawl 112 inward until the pawl tip 116 and/or the outward-most pawl support bracket 114 engages the stop surface 172 of the latch catch bracket 154. The stop surface 172 may be configured to engage the pawl tip 116 and/or pawl support bracket 114 to stop the rotation of the top plate 78 with the pawl 112 aligned with the locking slot 162. At that position and after the pawl tip 116 clears the end of the camming surface 158, the resilient member 122 extends the pawl tip 116 into the locking slot 162 to lock the top plate 78 and operator seat 84 in the backhoe position 35. As the top plate 78 is repositioned, the magnet 176 may rotate into position overlying the rear seat position sensor 44b to cause the sensor 44b to close and transmit a signal to the ECM 24 indicating that the operator seat 84 is in the backhoe position 35.

Figure 11:
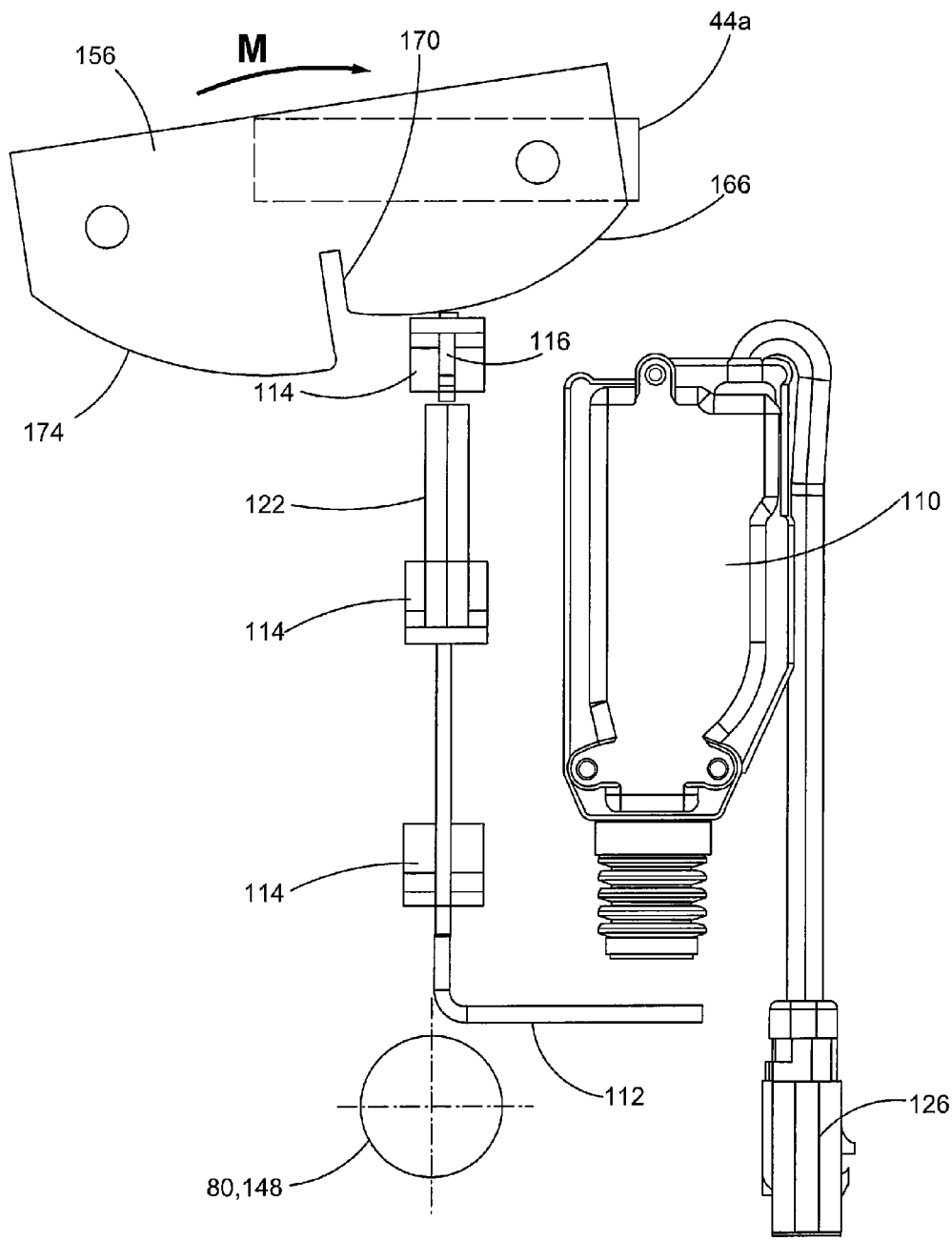
FIG. 11 is an enlarged top view of the actuator, pawl and one-way latch catch bracket with the pawl tip engaging the camming surface.
Figure 12:
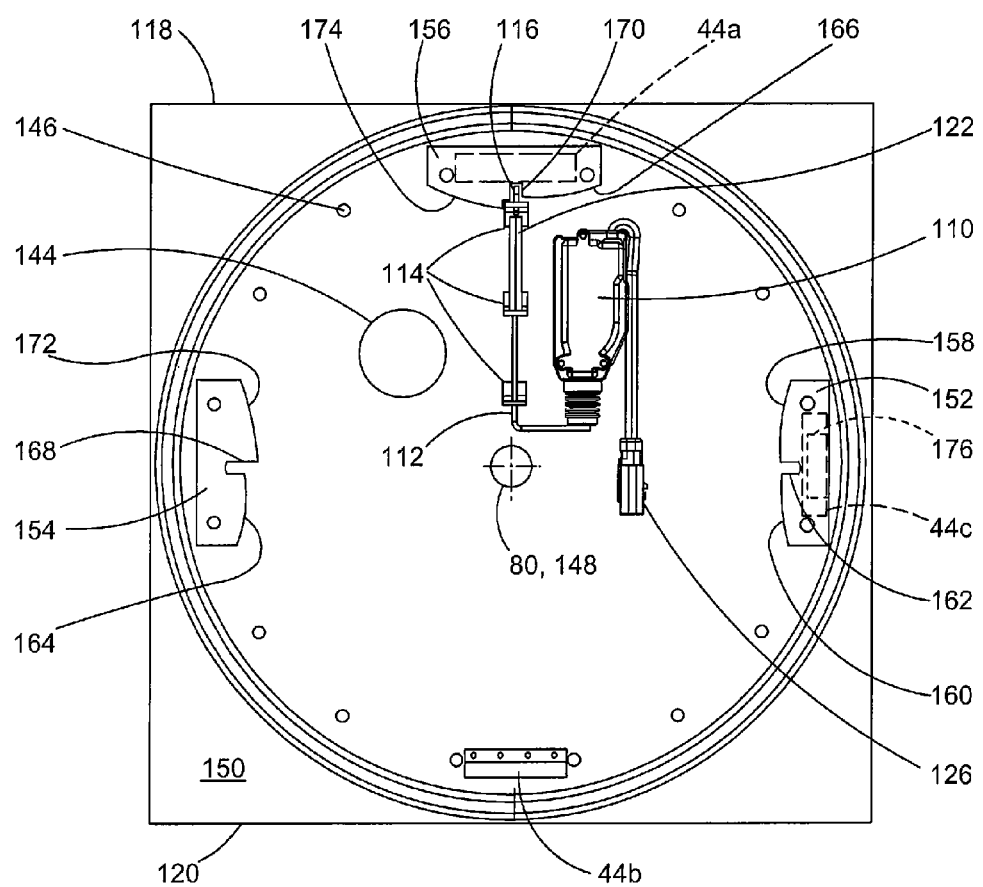
FIG. 12 is a top view of FIG. 7 with the swivel seat assembly in the middle facing position of FIG. 3.

Based on the illustrated arrangement of the latch catch brackets 152, 154, 156, the top plate 78 and operator seat 84 are rotated in the clockwise direction from either the loader position 34 or backhoe position 35 to move the swivel seat assembly 22 to the middle facing position 36. The operator may actuate the steering wheel latch control switch 90 or joystick latch control switch 94 when in the loader position 34, or the rear console latch control switch 92 or joystick latch control switch 94 when in the backhoe position 35, to cause the actuator 110 to drive the pawl 112 to a retracted position. As the end bracket 156 rotates toward and approaches the pawl 112, the camming surface 166 engages the pawl tip 116 and pushes the pawl 112 inward as shown in FIG. 11 with the direction of rotation indicated by the arrow "M". The pawl tip 116 engages the camming surface 166 and rides along the camming surface 166 as the operator seat rotates into the middle facing position 36.

The stop surface 174 may be configured in a similar manner as the stop surface 172 to engage the pawl tip 116 and/or pawl support bracket 114 to stop the rotation of the top plate 78 with the pawl 112 aligned with the locking slot 170. At that position and after the pawl tip 116 clears the end of the camming surface 166, the resilient member 122 extends the pawl tip 116 into the locking slot 170 to lock the top plate 78 and operator seat 84 in the middle facing position 36. As the top plate 78 is repositioned, the magnet 176 may rotate into position overlying the middle seat position sensor 44c to cause the sensor 44c to close and transmit a signal to the ECM 24 indicating that the operator seat 84 is in the middle facing position 36.

The illustrated design and the preceding discussion assume that operators will use their legs to swivel the operator seat 84 between positions 34, 35, 36 when the pawl 112 is disengaged. However, it is also contemplated by the inventors that the swivel seat assembly 22 may further be provided with a drive motor, gearing or other automated drive mechanism operatively coupled to the top plate 78 or operator seat 84 to cause the rotation of the seat 84. In such embodiments, the cab may be provided with an additional control switch or switches causing the drive mechanism to engage or operate to rotate the operator seat 84 in either direction. In further embodiments, separate control switches may be provided for each discrete position of the seat (e.g., loader position 34, backhoe position 35 and middle facing position 36) and the ECM 24 may be programmed to cause the actuator 110 to unlock the top plate 78 and seat 84, and to operate the drive mechanism to rotate the seat 84 to the selected position 34, 35 or 36.

Figure 13:
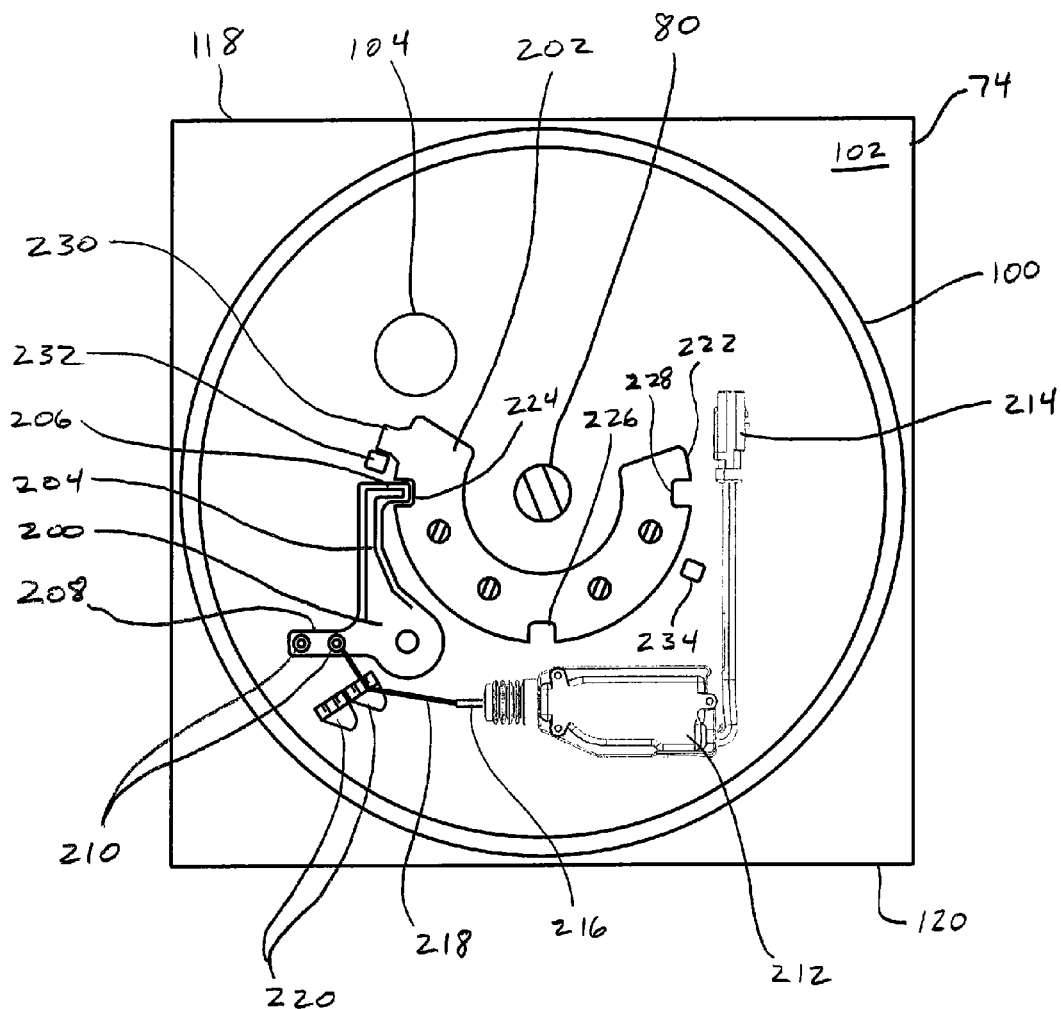
FIG. 13 is a top view of an alternative embodiment of the swivel seat assembly of FIG. 1 in the loader position of FIG. 1 with the operator seat and top plate removed for clarity.
Figure 14:
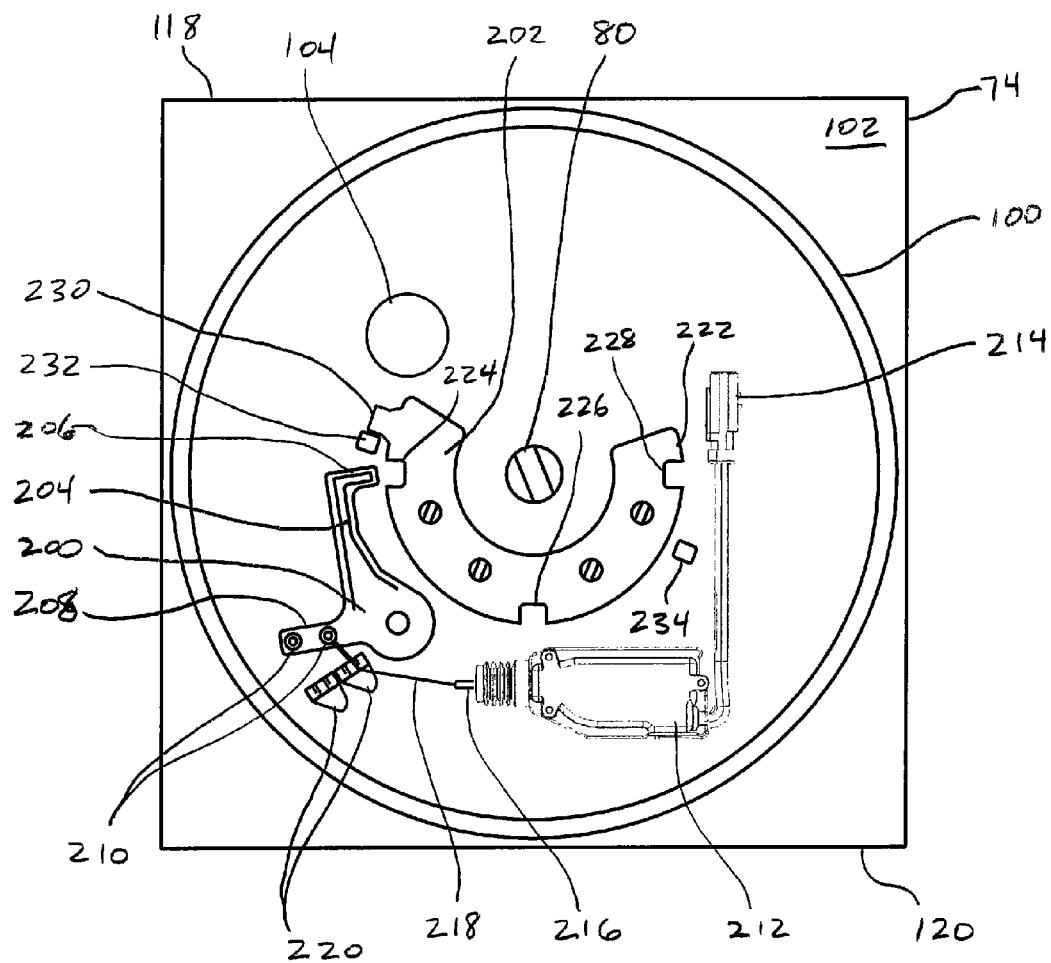
FIG. 14 is the top view of FIG. 13 with the swivel seat assembly in the loader position of FIG. 1 and the pawl disengaged from the backhoe locking slot of the multi-position latch catch bracket.

FIGS. 13-16 illustrated an embodiment of the swivel seat assembly 22 with an alternative electro-mechanical locking assembly. For the sake of clarity, the top plate 78 and the operator seat 84 are removed, and similar components of the seat assembly 22 as discussed above are identified by the same reference numerals. Referring to FIG. 13, the linearly moving pawl 112 and latch catch brackets 152, 154, 156 are replaced by a rotating pawl 200 pivotally mounted to the top surface 102 of the bottom plate 74, and multi-position latch catch bracket 202 mounted to the bottom surface 150 of the top plate 78 (not shown). The pawl 200 includes a latch bar 204 with an outwardly extending pawl tip 206, and a cable arm 208 including one or more cable connectors 210. The pawl 200 may be engaged by a biasing mechanism (not shown), such as a spring, that normally biases the pawl 200 toward the engaged or locking position shown in FIG. 13. An actuator 212 and corresponding wiring harness 214 may also be mounted to the top surface 102 of the bottom plate 74 proximate the pawl 112. An actuator signal line (not shown) passing through the access hole 144 may operatively connect the actuator 212 to the latch control switches 90, 92, 94 and/or the ECM 24 as discussed above. The actuator 212 includes a cable pull bar 216 having a normally extended position as shown in FIG. 13 and a first end of a cable 218 attached thereto. A second end of the cable 218 is connected to one of the cable connectors 210 of the cable arm 208. If necessary, the cable 218 may be threaded through a cable guide 220 that redirects the cable 218 to provide the necessary mechanical advantage to rotate the pawl 200. In some implementations, a second cable 218 from a backup or override manual actuation mechanism may be threaded through a second cable guide 220 and attached to another cable connector 210.

The multi-position latch catch bracket 202 is mounted on the bottom surface 150 of the top plate 78 and rotates about the shaft 80 with the top plate 78 and operator seat 84. In the illustrated embodiment, the latch catch bracket 202 is semi-circular and has a curved outer surface 222 that interfaces with the pawl 200. Those skilled in the art will understand that the latch catch bracket 202 could be circular and completely encircle the shaft 80. The outer surface 222 includes a first locking slot 224 corresponding to, for example, the first or loader position of the operator seat 84 as described above, a second locking slot 226 corresponding to the second or backhoe position, and a third locking slot 228 corresponding to the intermediate of position of the operator seat 84. The number and positions of the locking slots 224, 226, 228 are exemplary only, and those skilled in the art will understand that the number and position, and the extent of the latch catch bracket 202 may be varied to allow the top plate 78 to move between and lock in the positions necessary in a specific implementation. The outer surface 222 of the latch catch bracket 202 may also include an outwardly extending limit stop arm 230 configured to engage a first limit stop post 232 and a second limit stop post 234 mounted on the top surface 102 of the bottom plate 74 and defining the extents of rotation of the operator seat 84.

FIG. 13 shows the latch catch bracket 202 in the first or loader position illustrated and discussed above, with the pawl tip 206 disposed in the first locking slot 224 to hold the top plate 78 and the operator seat 84 in place. The biasing mechanism rotates the pawl 200 into the illustrated position when the cable pull bar 216 is in the extended position. When the operator of the machine 10 actuates one of the latch control switches 90, 92, 94, the actuator 212 retracts the cable pull bar 216 to the position shown in FIG. 14 to pull the cable 218 and rotate the pawl 200 against the force of the biasing mechanism to disengage the pawl tip 206 from the first locking slot 224. Once the pawl tip 206 is out of the first locking slot 224, the top plate 78 and operator seat 84 are free to rotate about the shaft 80. The first limit stop post 232 engages the limit stop arm 230 to prevent the latch catch bracket 202 from rotating counterclockwise. Instead, the latch catch bracket 202 rotates clockwise toward the second locking slot 246, and the top plate 78 and operator seat 84 correspondingly rotate toward the intermediate and backhoe positions.

Figure 15:
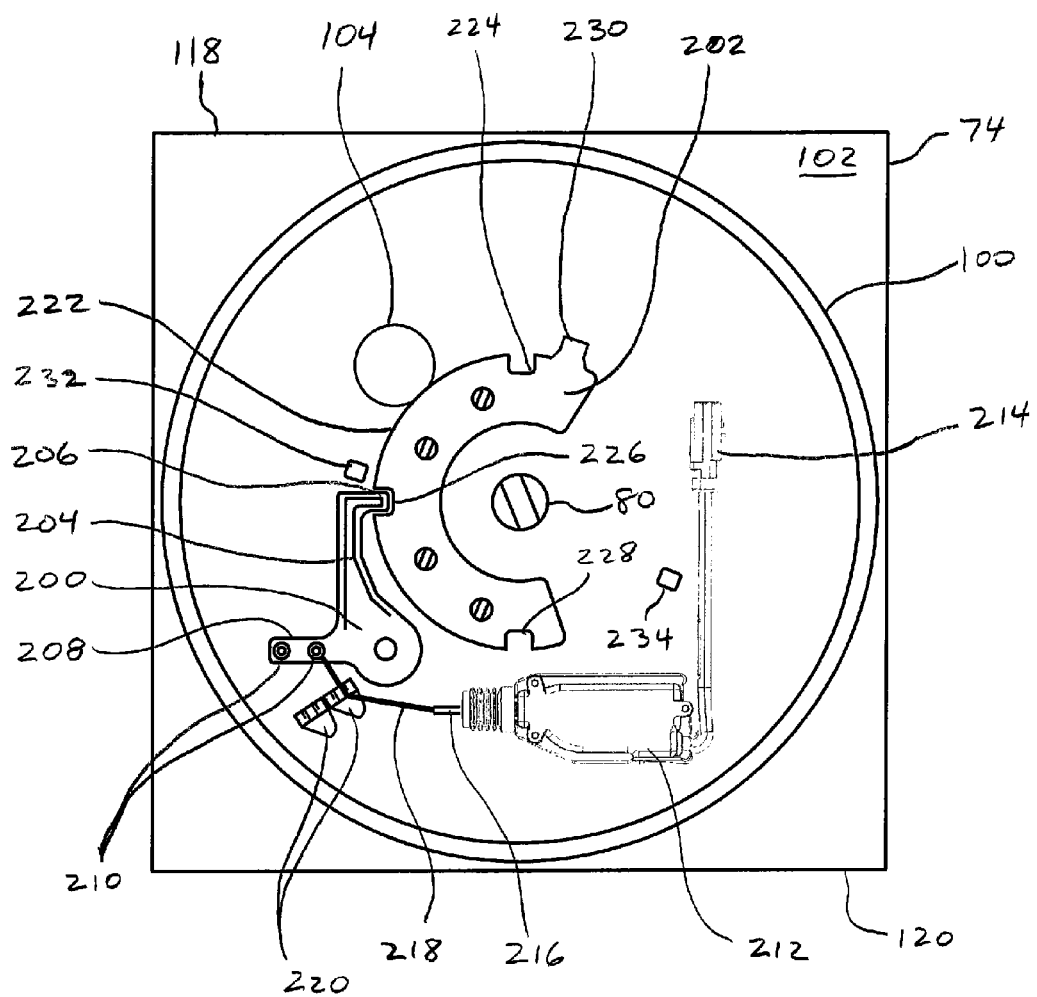
FIG. 15 is the top view of FIG. 13 with the swivel seat assembly in the middle facing position of FIG. 3.
Figure 16:
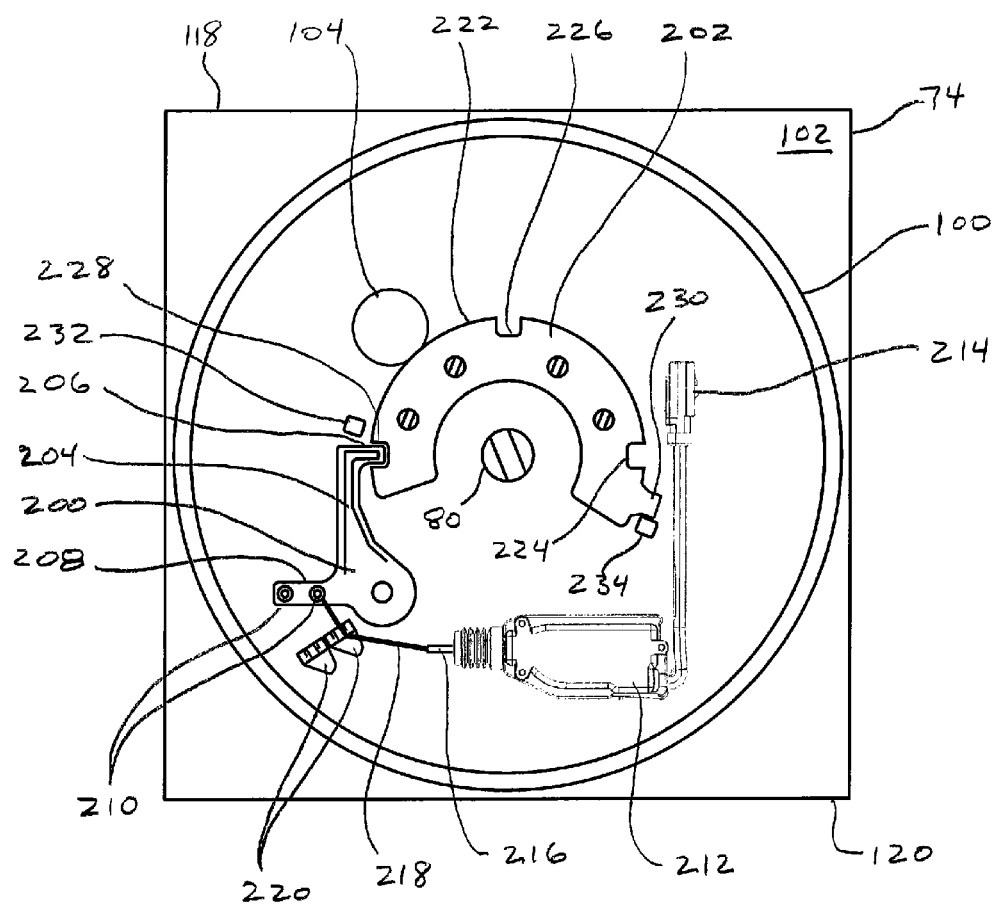
FIG. 16 is the top view of FIG. 13 with the swivel seat assembly in the backhoe position of FIG. 2.

When the top plate 78 arrives at the intermediate position, the pawl 200 can rotate toward its locked position and enter the second locking slot 246 under the biasing force of the biasing mechanism as shown in FIG. 15. As the seat 84 rotates, the operator may continue to actuate the one of the latch control switches 90, 92, 94 to keep the cable pull bar 216 retracted and the pawl tip 206 out of engagement with the outer surface 222 of the latch catch bracket 202. Alternatively, the operator may release the one of the latch control switches 90, 92, 94 to allow the cable pull bar 216 to extend and the pawl 200 to rotate under the influence of the biasing mechanism. The pawl tip 206 will engage the outer surface 222 of the latch catch bracket 202 as the bracket 202 rotates and will drop into the second locking slot 226 when the bracket 202 is aligned as shown in FIG. 15. In a similar manner, actuating one of the latch control switches 90, 92, 94 disengages the pawl tip 206 from the second locking slot 226 to allow further rotation of the latch catch bracket 202 toward the third locking slot 228 and the backhoe position as shown in FIG. 16. At that point, the limit stop arm 230 is engaged by the second limit stop post 234 to prevent the operator seat 84 from rotating past the backhoe position.

Though not shown, the embodiment shown in FIGS. 13-16 may include a position sensing mechanism. The mechanism may include the magnet 176 and position sensors 44*a*, 44*b*, 44*c* as discussed above. Of course, other position sensing mechanisms may be implemented as well. For example, optical or mechanically actuated limit switches may be implemented with appropriate triggering mechanisms to actuate the limit switches when the top plate 78 is in one of the designated seat positions. As a further alternative, a rotary position sensor capable of determining the angular position of the shaft 80 may be installed at the shaft 80. Those skilled in the art will understand that other position sensing mechanisms may be implemented in the swivel seat assembly, and such mechanisms are contemplated by the inventors as having use in swivel seat assemblies in accordance with the present disclosure.

While the preceding text sets forth a detailed description of numerous different embodiments of the invention, it should be understood that the legal scope of the invention is defined by the words of the claims set forth at the end of this patent.

The detailed description is to be construed as exemplary only and does not describe every possible embodiment of the invention since describing every possible embodiment would be impractical, not impossible. Numerous alternative embodiments could be implemented, using either current technology or technology developed after the filing date of this patent, which would still fall within the scope of the claims defining the invention.

What is claimed is:

1. A swivel seat assembly for a machine, comprising:
   a bottom plate mounted to a frame of the machine to prevent rotation of the bottom plate relative to the machine about a rotational axis;
   a top plate pivotally mounted to the bottom plate for rotation of the top plate relative to the bottom plate about the rotational axis;
   an operator seat mounted to the top plate for rotation with the top plate about the rotational axis;
   an actuator mounted on the bottom plate;
   a latching member moveably mounted on the bottom plate and operatively connected to the actuator;
   at least two locking slots associated with the top plate and each defining a locking position of the top plate, with a first locking slot defining a first locking position and a second locking slot defining a second locking position, where the latching member engages the first locking slot to lock the top plate in the first locking position and the latching member engages the second locking slot to lock the top plate in the second locking position, and wherein the top plate rotates relative to the bottom plate between the first locking position and the second locking position; and
   a remote switch operatively connected to the actuator, wherein actuation of the remote switch when the latching member engages one of the first locking slot and the second locking slot cause the actuator to operate to disengage the latching member from the one of the first locking slot and the second locking slot to allow the top plate to rotate the latching member away from the one of the first locking slot and the second locking slot and toward the other of the first locking slot and the second locking slot.

2. The swivel seat assembly of claim 1, comprising:
   a first latch catch bracket mounted on the top plate and including the first locking slot; and
   a second latch catch bracket mounted on the top plate and including the second locking slot.

3. The swivel seat assembly of claim 2, comprising a stop member mounted on the top plate, and wherein the first latch catch bracket and the second latch catch bracket each comprise a stop surface engaging the stop member when the top plate is disposed at the corresponding one of the first locking position and the second locking position, wherein the stop surface of the first latch catch bracket stops the top plate from rotating in a first direction, and the stop surface of the second latch catch bracket stops the top plate from rotating in an opposite direction.

4. The swivel seat assembly of claim 3, comprising a support bracket mounting the latching member to the bottom plate and allowing movement of the latching member relative to the bottom plate, wherein the stop member comprises the support bracket.

5. The swivel seat assembly of claim 1, wherein the latching member moves between engaging one of the first locking slot and the second locking slot and disengaging from the one of the first locking slot and the second locking slot along a linear path.

6. The swivel seat assembly of claim 1, wherein the at least two locking slots comprises a third locking slot associated with the top plate and defining a third locking position of the top plate where the latching member engages the third locking slot to lock the top plate in the third locking position, wherein the third locking slot is located at a position along a path of travel of the latching member relative to the top plate as the top plate rotates between the first locking position and the second locking position.

7. The swivel seat assembly of claim 1, comprising a latch bracket having a curved outer surface, wherein the at least two locking slots are defined in the curved outer surface of the latch bracket.

8. The swivel seat assembly of claim 7, wherein the latching member comprises a pawl pivotally mounted on the bottom plate and having a pawl tip configured to be alternately received into each of the at least two locking slots, wherein the actuator operates to rotate the pawl from a locking slot engaged position to a locking slot disengaged position.

9. A method of swiveling a swivel seat assembly of a machine, the swivel seat assembly including a bottom plate mounted to a frame of the machine to prevent rotation of the bottom plate relative to the machine about a rotational axis, a top plate pivotally mounted to the bottom plate for rotation of the top plate relative to the bottom plate about the rotational axis, an operator seat mounted to the top plate for rotation with the top plate about the rotational axis, an actuator mounted on the bottom plate, a latching member moveably mounted on the bottom plate and operatively connected to the actuator, at least two locking slots associated with the top plate and each defining a locking position of the top plate, with a first locking slot defining a first locking position and a second locking slot defining a second locking position, where the latching member engages the first locking slot to lock the top plate in the first locking position, and the latching member engages the second locking slot to lock the top plate in the second locking position, and wherein the top plate rotates relative to the bottom plate between the first locking position and the second locking position, and a remote switch operatively connected to the actuator, the method comprising:
   engaging the first locking slot with the latching member to lock the top plate in the first locking position;
   actuating the remote switch to cause the actuator to disengage the latching member from the first locking slot;
   rotating the top plate from the first locking position to the second locking position; and
   engaging the second locking slot with the latching member when the top plate rotates into the second locking position to lock the top plate in the second locking position.

10. The method of swiveling a swivel seat assembly of claim 9, wherein inserting the latching member comprises biasing the latching member toward an engagement position.

11. The method of swiveling a swivel seat assembly of claim 9, comprising
   engaging a stop member mounted on the top plate with a first stop surface of the bottom plate to stop the top plate from rotating in a first direction; and
   engaging the stop member with a second stop surface of the bottom plate to stop the top plate from rotating in an opposite direction.

12. The method of swiveling a swivel seat assembly of claim 9, comprising moving the latching member along a linear path to disengage the latching member from the first locking slot.

13. The method of swiveling a swivel seat assembly of claim 9, wherein the at least two locking slots comprises a third locking slot associated with the top plate and defining a third locking position of the top plate where the latching member engages the third locking slot to lock the top plate in the third locking position, wherein the third locking slot is located at a position along a path of travel of the latching member relative to the top plate as the top plate rotates between the first locking position and the second locking position, the method comprising engaging the third locking slot with the latching member when the top plate rotates into the third locking position to lock the top plate in the third locking position as the top plate rotates from the first locking position toward the second locking position.

14. An electro-mechanical latching mechanism for limiting relative rotational movement between a first component and a second component pivotally connected to the first component, comprising:
- an actuator mounted on the first component;
- a latching member moveably mounted on the first component and operatively connected to the actuator;
- at least two locking slots associated with the second component and each defining a locking position of the second component, with a first locking slot defining a first locking position and a second locking slot defining a second locking position, where the latching member engages the first locking slot to lock the second component in the first locking position and the latching member engages the second locking slot to lock the second component in the second locking position, and wherein the second component rotates relative to the first component between the first locking position and the second locking position; and
- a remote switch operatively connected to the actuator, wherein actuation of the remote switch when the latching member engages one of the first locking slot and the second locking slot cause the actuator to operate to disengage the latching member from the one of the first locking slot and the second locking slot to allow the second component to rotate the latching member away from the one of the first locking slot and the second locking slot and toward the other of the first locking slot and the second locking slot.

15. The electro-mechanical latching mechanism of claim 14, comprising:
- a first latch catch bracket mounted on the second component and including the first locking slot; and
- a second latch catch bracket mounted on the second component and including the second locking slot.

16. The electro-mechanical latching mechanism of claim 15, comprising a stop member mounted on the second component, and wherein the first latch catch bracket and the second latch catch bracket each comprise a stop surface engaging the stop member when the second component is disposed at the corresponding one of the first locking position and the second locking position, wherein the stop surface of the first latch catch bracket stops the second component from rotating in a first direction, and the stop surface of the second latch catch bracket stops the second component from rotating in an opposite direction.

17. The electro-mechanical latching mechanism of claim 15, comprising a support bracket mounting the latching member to the first component and allowing movement of the latching member relative to the first component, wherein the stop member comprises the support bracket.

18. The electro-mechanical latching mechanism of claim 14, wherein the latching member moves between engaging one of the first locking slot and the second locking slot and disengaging from the one of the first locking slot and the second locking slot along a linear path.

19. The electro-mechanical latching mechanism of claim 14, comprising a latch bracket having a curved outer surface, wherein the at least two locking slots are defined in the curved outer surface of the latch bracket.

20. The electro-mechanical latching mechanism of claim 19, wherein the latching member comprises a pawl pivotally mounted on the first component and having a pawl tip configured to be alternately received into each of the at least two locking slots, wherein the actuator operates to rotate the pawl from a locking slot engaged position to a locking slot disengaged position.

* * * * *